United States Patent [19]

Salensky

[11] Patent Number: 4,715,977
[45] Date of Patent: Dec. 29, 1987

[54] MAGNETIC COATING COMPOSITIONS FROM CARBOXYLIC ACID-GRAFTED PHENOXY RESINS

[75] Inventor: George A. Salensky, Hunterdon County, N.J.

[73] Assignee: Union Carbide Corporation, Danbury, Conn.

[21] Appl. No.: 914,794

[22] Filed: Oct. 2, 1986

Related U.S. Application Data

[62] Division of Ser. No. 725,535, Apr. 22, 1985, Pat. No. 4,638,038.

[51] Int. Cl.$^4$ ............................ C04B 35/04; H01F 1/00
[52] U.S. Cl. ................................. 252/62.54; 427/128; 428/694; 523/181
[58] Field of Search ..................... 252/62.54; 427/128; 428/694; 523/181

[56] References Cited

U.S. PATENT DOCUMENTS

| 4,576,726 | 3/1986 | Watanabe et al. | 252/62.54 |
| 4,594,174 | 6/1986 | Nakayama et al. | 252/62.54 |
| 4,640,790 | 2/1987 | Sylvester et al. | 252/62.54 |
| 4,645,611 | 2/1987 | Campbell et al. | 252/62.54 |
| 4,652,388 | 3/1987 | Gold | 252/62.54 |

*Primary Examiner*—Lucille M. Phynes
*Attorney, Agent, or Firm*—J. B. Mauro

[57] ABSTRACT

Phenoxy resins are acid-grafted by reaction of secondary hydroxyls with monoanhydrides of di- or polycarboxylic acids. The grafted resins have improved adhesion to smooth surfaces, can be readily emulsified, and are also useful in coatings for magnetic recording media.

11 Claims, No Drawings

MAGNETIC COATING COMPOSITIONS FROM CARBOXYLIC ACID-GRAFTED PHENOXY RESINS

This application is a division of prior U.S. application Ser. No. 725,535, filing date Apr. 22, 1985, now U.S. Pat. No. 4,638,038, issued Jan. 20, 1987.

BACKGROUND OF THE INVENTION

This invention relates to polyhydroxyethers, known as phenoxy resins, and their modification by grafting thereon moieties containing pendant carboxyl groups.

Phenoxy resins, sometimes referred to herein as "thermoplastic polyhydroxyethers," are known in the art as components of corrosion-resistant coatings, e.g., zinc-rich coatings for metallic substrates, as described in U.S. Pat. No. 4,370,382. Phenoxy-based coatings of the prior art are not, however, entirely satisfactory in that their adhesion to smooth substrates, e.g., metallic substrates, is subject to degradation by corrosion, particularly in environments of high humidity.

Carboxylic acids, particularly those with a hydrophobic hydrocarbon chain, are known to have corrosion inhibitive properties for steel exposed to near neutral salt solutions. Salts of weak acids, such as benzoic acid, have been used as corrosive inhibitors in boiler compounds and antifreeze solutions. However, organic acids, when used in coatings, often tend to migrate to the steel interface and interfere with the adhesion of the coating resin. It would be very useful, therefore, if a way could be found to realize the beneficial corrosion inhibiting effects of a carboxylic acid-containing coating, but without suffering the deleterious effects of the migration of the carboxylic acid.

It is also very desirable if, at the same time, the adhesion of a phenoxy-based coating could be improved, particularly under conditions of high ambient humidity.

Likewise, it would be desirable to provide compositions which can be readily emulsified in water, for use where solvent-free or minimum solvent systems are needed.

The carboxylic acid-containing phenoxy resins of this invention can be used as general purpose and corrosion resistant coatings, and particularly for highly pigmented systems such as zinc-rich and magnetic media coatings. These resins have improved dispersing properties for particulate materials, such as powders. They may be used in adhesives and laminating systems with improved wet adhesion, and particularly for polar and metallic substrates. The resins are also useful in water-dispersible coatings, adhesives and laminating systems.

All these commercially important objectives are met by the present invention.

SUMMARY OF THE INVENTION

This invention provides a phenoxy resin having pendant secondary hydroxyl groups of which about 3 to about 50% of such hydroxyl groups have been reacted to produce moieties having pendant carboxyl groups.

Also provided is a method for producing such a phenoxy resin, comprising:
(a) preparing a solution of the phenoxy resin, a monoanhydride of a di- or polycarboxylic acid, and a catalytically effective amount of an amine catalyst, in a nonreactive solvent, and
(b) maintaining the solution at such temperature that reaction proceeds to form a grafted phenoxy resin in which about 3 to about 50%, preferably about 5 to about 25%, of the hydroxyl groups of the phenoxy resin have been reacted with the anhydride to produce moieties having pendant carboxyl groups.

In addition, this invention comprises a phenoxy coating composition comprising:
(a) a phenoxy resin having pendant secondary hydroxyl groups of which about 3 to about 50%, preferably about 5 to about 25%, of such hydroxyl groups have been reacted to produce moieties having pendant carboxyl groups, and
(b) a carrier for said phenoxy resin, said coating composition when coated onto steel, having improved adhesion to the steel under high humidity conditions as compared to said phenoxy resin not so reacted, and
(c) optionally, a particulate material, such as a pigment, iron oxide powder, and the like.

This invention further provides an aqueous emulsion comprising:
(a) a phenoxy resin having pendant secondary hydroxyl groups of which about 3 to about 50%, preferably about 5 to about 25%, of such hydroxyl groups have been reacted to produce moieties having pendant carboxyl groups, at least some (e.g., about 40 to about 100%, preferably about 60 to about 90%) of which carboxyl groups have been neutralized with an aqueous amine or hydroxide, and
(b) water.

Also provided is a method for producing such an emulsion, comprising:
(a) preparing a solution of said phenoxy resin in an organic solvent,
(b) adding said solution, with stirring, to a solution of an alkaline agent in water,
(c) maintaining the resulting mixture at a temperature and for a time sufficient to effect a reaction whereby a sufficient number (e.g., about 40 to about 100%, preferably about 60 to about 90%) of carboxyl groups are neutralized to provide a stable emulsion,
(d) volatilizing the solvent to produce a stable, essentially solvent-free or low solvent emulsion.

In addition, this invention provides a magnetic coating composition for magnetic recording media comprising:
(a) a phenoxy resin having pendant secondary hydroxyl groups of which about 3 to about 50%, preferably about 5 to about 25%, of such hydroxyl groups have been reacted to produce moieties having pendant carboxyl groups,
(b) a magnetic powder, and
(c) an organic solvent,
and wherein the magnetic powder is present in the concentration range of about 1:1 to about 30:1 preferably about 1.5:1 to about 10:1 magnetic powder:phenoxy resin.

Finally, this invention provides an article comprising a substrate coated with the above coating compositions or emulsions.

DETAILED DESCRIPTION OF THE INVENTION

The carboxylic acid-grafted phenoxy resins of this invention are achieved by reaction of monoanhydrides of di- or polycarboxylic acids with a certain proportion, preferably about 5 to about 25%, of the secondary hydroxyl groups present on the resin's polymeric chain. In general, the polymer should have a molecular weight of about 15,00 to about 45,000, preferably about 22,000 to about 37,000 and ideally about 30,000. It is imperative that a monoester be formed and that diester formation be as close to nil as possible, since diester formation will result in a high viscosity or gel. The monoester reaction will predominate at controlled reaction temperatures and under the influence of catalysis, generally of the tertiary amine type. In addition, the phenoxy resin should contain little or no epoxide functionality, thereby avoiding any possible reaction with the carboxyl groups.

The terms "thermoplastic poly(hydroxyether)" and "phenoxy" herein refer to substantially linear polymers having the general formula:

[—D—O—E—O—]$_n$ wherein D is the radical residuum of a dihydric phenol, E is an hydroxyl-containing radical residuum of an epoxide and n represents the degree of polymerization and is at least 30 and is preferably 80 or more. The term "thermoplastic poly(hydroxyether)" is intended to include mixtures of at least two thermoplastic poly(hydroxyethers).

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide, generally in an aqueous medium, at a temperature of about 10° to about 50° C. until at least about 60 mole percent of the epihalohydrin has been consumed. The thermoplastic poly(hydroxyethers) thus produced have reduced viscosities of at least about 0.4. Reduced viscosity values are computed by use of the equation:

$$\text{Reduced Viscosity} = \frac{t_s - t_o}{ct_o}$$

wherein $t_o$ is the efflux time of the solvent (tetrahydrofuran), $t_s$ is the efflux time of the poly(hydroxyether) solution, c is the concentration of the poly(hydroxyether) solution in grams of poly(hydroxyether) per 100 ml. of tetrahydrofuran.

The dihydric phenol contributing the phenol radical residuum, D, can be either a dihydric mononuclear or a dihydric polynuclear phenol such as those having the general formula:

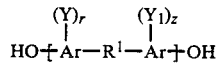

wherein Ar is an aromatic divalent hydrocarbon such as naphthylene and, preferably, phenylene, Y and Y$_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and R$^1$ is a bond between adjacent carbon atoms as in dihydroxydiphenyl or is a divalent radical including, for example,

—O—, —S—, —SO—, —SO$_2$—, and —S—S—, and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or R$^1$ can be polyalkoxy, or polysiloxy, or two or more alkylidene radicals separated by a aromatic ring, a tertiary amino group, an ether linkage, a carbonyl group or a sulfur-containing group such as sulfoxide, and the like.

Examples of specific dihydric polynuclear phenols include, among others:

The bis(hydroxyphenyl)alkanes such as
2,2-bis-(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl ethane,
1,2-bis(4-hydroxyphenyl)-ethane,
1,1-bis(4-hydroxy-2-chlorophenyl)ethane,
1,1-bis-(3-methyl-4-hydroxyphenyl)ethane,
1,3-bis(3-methyl-4-hydroxyphenyl)propane,
2,2-bis(3-phenyl-4-hydroxyphenyl)-propane,
2,2-bis(3-isopropyl-4-hydroxyphenyl)propane,
2,2-bis(2-isopropyl-4-hydroxyphenyl)propane,
2,2-bis-(4-hydroxylnaphthyl)propane,
2,2-bis(4-hydroxyphenyl)-pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxy-phenyl-1,2-bis(phenyl)propane,
2,2,-bis(4-hydroxyphenyl)-1-phenyl-propane and the like;

Di(hydroxyphenyl)sulfones such as
bis(4-hydroxy-phenyl)sulfone, 2,4'-dihydroxyldiphenyl sulfone, 5'-chloro-2,4'-dihydroxydiphenyl sulfone, 5'-chloro-4,4'-dihydroxydiphenyl sulfone and the like:

Di(hydroxyphenol)ethers such as
bis(4-hydroxy-phenyl)ether, the 4,3'-, 4,2'-, 2,2'-, 2,3'-, di-hydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)-ether,
bis(4-hydroxy-3flurophenyl)ether,
bis(4-hydroxy-3-bromophenyl)ether,
bis(4-hydroxynaphthyl)ether,
bis(4-hydroxy-3-chloronaphthylether,
bis(2-hydroxydiphenyl)-ether,
4,4'-dihydroxy-2,6-dimethoxydiphenyl ether,
4,4-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3'trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

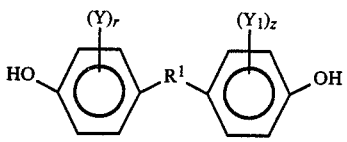

wherein Y and $Y_1$ are as previously defined, r and z have values from 0 to 4, inclusive, and $R^1$ is a divalent, saturated aliphatic hydrocarbon radical, particularly alkylene and alkylidene radicals, having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms, thus,

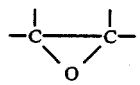

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

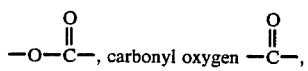

and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate),
bis(3,4-epoxycyclohexyl-methyl)adipate,
bis(3,4-epoxycyclohexyl-methyl)phthalate,
6-methyl-3,4-epoxycyclohexylmethyl-6-methyl-3,4-epoxycyclohexane carboxylate,
2-chloro-3,4-epoxycylohexylmethyl-2-chloro-3,4-epoxycyclohexane-carboxylate, diglycidyl ether,
bis(2,3-epoxycyclopentyl)-ether, 1,5-pentanediol bis(4-methyl-3,4-epoxycyclohexyl-methyl)ether,
bis(2,3-epoxy-2-ethylhexyl)adipate, diglycidyl maleate, diglycidyl phthalate,
3-oxa-tetracyclo[4.4.0.1$^{7,10}$.0$^{2,4}$]-undec-8-yl 2,3-epoxypropyl ether,
bis(2,3-epoxycyclopentyl)sulfone,
bis(3,4-epoxyhexoxypropyl)sulfone,
2,2'-sulfonyldiethyl,
bis(2,3-epoxycyclopentanecarboxylate),3-oxatetracyclo-[4.4.0.1$^{7,10}$.0$^{2,4}$]-undec-8-yl 2,3-epoxybutyrate,
4-pentenal-di-(6-methyl-3,4-epoxycyclohexylmethyl)acetal, ethylene glycol bis(9,10-epoxystearate), diglycidyl carbonate,
bis(2,3-epoxybutylphenyl)-2-ethylhexyl phosphate,
diepoxydioxane, butadiene dioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides have the grouping

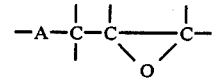

wherein A is an electron donating substituent such as

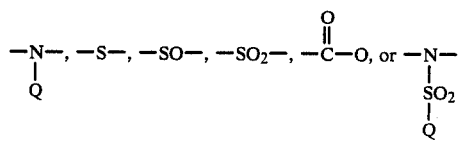

and Q is a saturated hydrocarbon radical such as an alkyl, cycloalkyl, aryl or aralkyl radical.

The preferred polyhydroxyether is available commercially as UCAR Phenoxy PKHH, a trade designation of Union Carbide Corporation for a condensation polymer derived from bisphenol-A (2,2-bis(p-hydroxyphenyl)propane and epichlorohydrin having the structural formula:

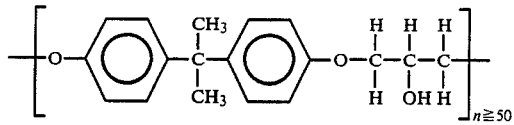

The phenoxy resin is available as a solution in glycol ether esters such as Cellosolve acetate (the acetate of a monoalkyl glycol ether sold under the Trademark Cellosolve by Union Carbide Corporation) or in pellet form which is readily soluble in a variety of solvents and solvent blends. The solid phenoxy resin sold under the designation PKHH by Union Carbide Corporation is soluble in the following solvents: butyl Carbitol, butyl Carbitol acetate, butyl Cellosolve, Carbitol solvent, Cellosolve acetate, Cellosolve solvent, diacetone alcohol, diethyl Carbitol, dimethylformamide, dimethyl sulfoxide, dioxane, ethoxy triglycol, mesityl oxide, methyl Cellosolve acetate, methyl ethyl ketone, and tetrahydrofuran.

Carbitol is a Trademark of Union Carbide Corporation for the monoalkyl ether of diethylene glycol.

The preparation of the above-described polyhydroxyethers is described in U.S. Pat. No. 3,305,528.

In addition to these polyhydroxyethers one may also employ the linear thermoplastic polyethers described in U.S. Pat. No. 3,177,089, U.S. Pat. No. 3,306,872, and U.S. Pat. No. 2,602,075.

Typical of the useful anhydrides are: succinic anhydride, citraconic anhydride, itaconic anhydride, alkenyl succinic anhydride, dodecenyl succinic anhydride, maleic anhydride, dichloromaleic anhydride, chlorendic anhydride, linoleic acid adduct of maleic anhydride, hexahydrophthalic anhydride, methyl tetrahydrophthalic anhydride, tetrahydrophthalic anhydride, maleic anhydride, maleic anhydride adduct of methylcyclopentadiene, trimellitic anhydride, phthalic anhydride, nadic anhydride, and the like. Itaconic anhydride, maleic anhydride, tetrahydrophathalic anhydride, linoleic acid adduct of maleic anhydride, and the maleic anhydride adduct of methylcyclopentadiene, all having reactive double bonds capable of under going polymerization or copolymerization with other reactive, double bond-containing materials when subject to heat, catalysis or radiation, produce coatings with improved solvent and temperture resistance. Of these, succinic anhydride and trimellitic anhydride are especially preferred. Trimellitic anhydride has the following structure:

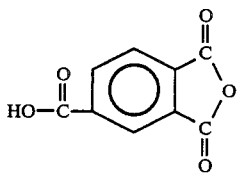

Therefore, compared to succinic anhydride or other monoanhydrides, each ester graft with the phenoxy resins generates two pendant carboxylic acid groups rather than one. It allows one to make a more polar molecule and the aromatic ester linkage is less subject to hydrolysis than that of aliphatic esters.

Suitable catalysts are Lewis bases or electron donors. An important class is tertiary amines. Examples of tertiary amines which may be used to catalyze the reaction of anhydrides with the secondary hydroxyl of a polyhydroxy ether to form a half-ester acid are as follows: linear diamines, of the formula $(CH_3)_2N(CH_2)_nN(CH_3)_2$ where n=1 to about 4, N,N,N',—N'-tetramethyl-1,3-butanediamine, alkyl tertiary monoamines, of the formula $N[(CH_2)_nCH_3]_3$ where n=1 to about 4, e.g., triethylamine, N,N'-dimethylpiperazine, N-methylmorpholine, triethylenediamine, hexamethylenetetramine, pyridine, pyrazine, quionoline, benzyldimethylamine, alpha-methylbenzyldimethylamine, N-alkyl imidazoles wherein the alkyl group contains 1 to about 4 carbon atoms, N-alkyl imidazolines wherein the alkyl group contains 1 to about 4 carbon atoms. Similarly, suitable catalysts include tertiary phosphines, such as triphenyl phosphine, tricyclohexyl phosphine, and the like. Of these, triethylene diamine (also known as "Dabco," a trade designation of Air Products Company) is especially preferred. Because of its structure, it is less hindered and more nucleophilic than most other generally available amines, and therefore is more effective.

Tertiary amines have an unshared pair of electrons in their outer orbital. They are attracted to areas of reduced electron density in the molecules with which they react. It is postulated (without intending to be bound to any particular theory) that an activated complex is formed, as shown with the following reaction of Dabco with succinic anhydride:

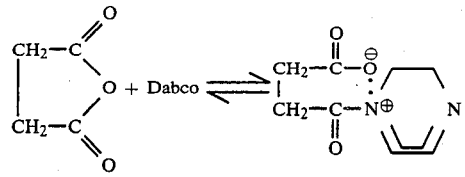

which is a quasi 6 membered zwitterion wherein complexation lowers the activation energy of the reaction

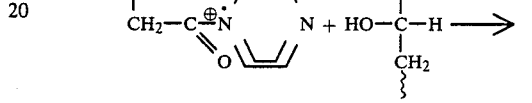

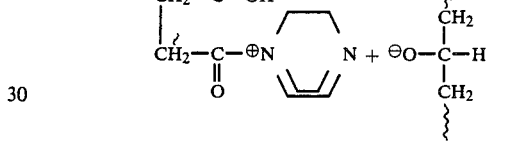

PENDANT CARBOXYLIC ACID HALF ESTER

The reaction between the phenoxy and the anhydride is preferably effected in a non-reactive solvent, such as dimethyl Carbitol (2-methoxyethylether), 2-ethoxyethyl ether, tetrahydrofuran, 1,4 dioxane, ethylene glycol dimethyl ether, ethylene glycol diethyl ether, methylisobutyl ketone, methylethyl ketone, cyclohexanone, dimethyl sulfoxide, dimethyl formamide, toluene, and the like. Of these, tetrahydrofuran is particularly preferred. In selecting a solvent, it is important to note that the solvent should not contain any reactive hydroxyl groups of hydrolyzable ester linkages.

Alternatively, the phenoxy can be dispersed in a poor solvent, such as an alkylated aromatic, to a fine particle size. The anhydride should be soluble in the solvent to form a continuous phase which can react on the surface of the particle. An example would be methyltetrahydrophthalic anhydride using benzyldimethylamine as catalyst. The preparation of a nonaqueous dispersion of 30,000 molecular weight polyhydroxyether, because of its high melt viscosity, would require a high shear mixer and the use of a high-boiling solvent or a pressue vessel to prevent evaporation of the solvent.

The desired reaction is illustrated by the reaction between Phenoxy PKHH and succinic anhydride:

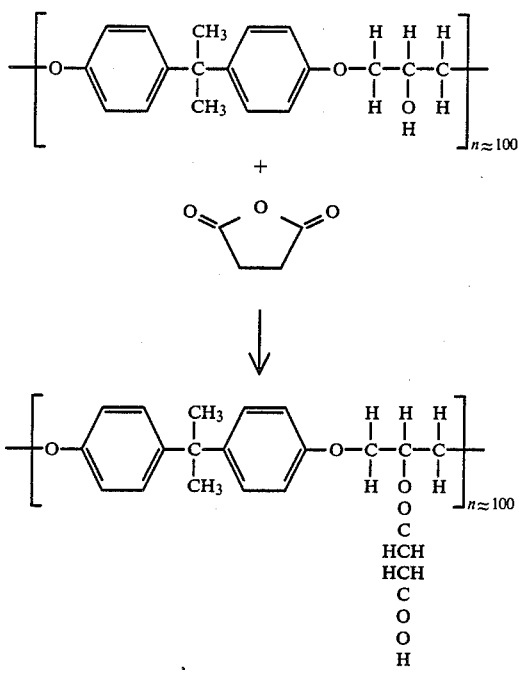

The concentrations of the various materials may vary substantially, depending upon the materials and operating condidtions selected. Optimization of the reaction would be a matter of routine experimentation within the skill of the art. In general, however, it may be expected that, on a weight percent basis, the concentration of the phenoxy resin would be about 98.9 to about 74.8, preferably about 97 to about 88%; the concentration of the anhydride would be about 1 to about 25, preferably about 3 to about 12%; and the concentration of the catalyst would be about 0.05 to about 0.5%.

The reaction mixture should be well stirred, and the reaction should be carried out at a temperature of about 80° to about 145°, preferably about 115° to about 135° C. These temperature ranges are recommended to obtain reasonable reaction rates without incurring gel problems. When temperatures as high as 145° C. are used, viscosity increase will probably be noted, indicating some reaction between the carboxyl and hydroxyl groups.

In conducting the reaction, it is desirable that only a minority of the available secondary hydroxyl groups be converted, in order to permit a later hydroxyl cross-linking reaction and to minimize water sensitivity of the polymer. Typically, only about 3 to about 50, preferably about 5 to about 25% of the available hydroxyls are reacted. Sufficient hydroxyl groups should be left in the phenoxy so the combination of hydroxyl and carboxy groups can co-react or react with cross-linkers, such as a variety of di- or polyisocyanates or melamine formaldehyde. The percent conversion is controlled by selecting the number of mols of anhydride necessary to react with the hydroxyl groups on the phenoxy, and then carrying out the reaction until no anhydride groups remain. When unsaturated anhydrides, such as tetrahydrophthalic anhydride, are used, additional cross-linking can take place via polymerization or copolymerization with other unsaturated materials by using heat, catalysis or radiation.

The invention is illustrated in more detail in the following examples. All parts and percentages are by weight, based on the entire recipe.

EXAMPLE 1

Preparation of Succinic Anhydride-Grafted Phenoxy Resin 1. 175 grams of dimethyl "Carbitol" were charged to a 500 cc flask. With good agitation, 83 grams dried (16 hours at 90° C.) Phenoxy PKHH resin were added.
2. The flask was heated to 150°-160° C. to dissolve the resin. 25 grams of the solvent were distilled off in order to drive off moisture in the resin solution which could react with the anhydride and result in some dicarboxylic acid formation.
3. The temperature was reduced to 120°-125° C. and 5.85 grams of succinic anhydride and 0.16 gram of triethylenediamine were added in order to insert one carboxyl group per 5 repeating units of phenoxy. The temperature was held at 120°-125° C. for the duration of the reaction.
4. The product was sampled periodically over 60 minutes, and it was determined by Fourier Transform Infrared Spectroscopy that the reaction had been completed in 5 minutes.
5. 86 grams of dimethyl "Carbitol" were then added to reduce the solids to 25%, and the flask was cooled to room temperature.

The viscosity of the succinic acid-grafted phenoxy at the 25% solids content was identical to that of the Phenoxy PKHH resin solution (9 strokes at 20° C.), indicating that the primary reaction was half-ester carboxylic acid formation with little or no diester formarion.

EXAMPLE 2

The procedure of Example 1 was repeated, except that tetrahydrofuran (THF) was used as the solvent instead of dimethyl Carbitol. The THF was dried over molecular sieves. Because of the relatively low boiling point of THF, the reaction was run at 64° C., which of course caused an increase in reaction time. The reaction again was tracked by taking periodic samples and analyzing them by Fourier Transform Infra-red Spectroscopy. The results are shown in Table I. In this table, the "Carbonyl Ratio" column shows the ratio of carbonyl peak heights of bands assigned to anhydride and esters. It is apparent from these data that the reaction was virtually over within 3 hours when triethylene diamine is used as a catalyst. The reaction is much closer to completion in 10 minutes with the catalyst than after 5½ hours without a catalyst.

TABLE I

| REACTION RATE OF SUCCINIC ANHYDRIDE WITH PHENOXY RESIN IN THF | | |
|---|---|---|
| | Carbonyl Ratio | |
| Reaction Time | No Catalyst | Triethylenediamine |
| 10 mins. | 6.0 | 0.67 |
| 1 hr. | 6.87 | 0.16 |
| 3 hrs. | 3.29 | 0.008 |
| 5½ hrs. | 2.57 | 0.00 |

EXAMPLE 3

The procedure of Example 1 was repeated, except that benzyldimethylamine was used as the catalyst instead of triethylenediamine. Again a satisfactory acid-grafted phenoxy resin was obtained.

EXAMPLE 4

Preparation of Trimellitic Anhydride-Grafted Phenoxy Resin 1. 170.4 grams of dried Phenoxy PKHH were dissolved in 300 grams of dry THF and the solution was charged to a 1-liter, 4-neck flask equipped with a stirrer and reflux condenser.
2. 23.1 grams of trimellitic anhydride and 0.3 gram of triethylenediamine (Dabco) were introduced with stirring.
3. The temperature was raised to 60° C. and the mixture was maintained overnight at that temperature.
4. 267 grams of THF were added, and the temperature was brought to ambient temperature.

The conversion was determined to be 96.5%. Because of the relatively low vapor pressure of trimellitic anhydride, the reaction was measured using differential titration with alcoholic and aqueous alkali:

It has been found that the anhydride-grafted phenoxy resins of this invention can be easily made into excellent emulsions in water. In contrast, ungrafted phenoxy resins of the prior art, when emulsification is attempted, do not emulsify but coagulate. Example 5 presents a typical procedure for emulsification.

EXAMPLE 5

Emulsion of Succinic Acid Anhydride-Grafted Phenoxy Resin

One hundred grams of a 25% solution of succinic anhydride-grafted phenoxy in tetrahydrofuran or 2-methoxyethyl ether, heated to 60° C., were added to the following mixture with stirring: one hundred grams of a mixture of distilled water 78.72%, butyl Cellosolve 20.01%, and dimethylethanolamine 1.27%, heated to 60° C.

A low viscosity, translucent emulsion was obtained with a pH of 6.9. Dimethylethanolamine, indicated above, was present in the water phase in sufficient concentration to form a soap with about 85% of the available carboxyl groups.

The tetrahydrofuran was removed in a rotating flask (Roto-Vac) under a vacuum of 27 inches of Hg using a 50° C. hot water bath. This then results in a solvent-free system.

The emulsion so produced was film-forming at room temperature in the presence of a small amount of filming agent, such as butyl Cellosolve. A fine powder film is obtained in the absence of a filming agent. Elevated temperature would then be required to flux the polymer particles.

Similar excellent results were obtained when a trimellitic anhydride-grafted phenoxy was used in the emulsion instead of the succinic anhydride product.

EXAMPLE 6

The procedure of Example 5 was repeated, except that the butyl Cellosolve cosolvent was deleted from the mixture. Again, excellent translucent micro-emulsions were obtained. In this case, however, the emulsions were not film-forming at room temperature; instead, they produced a fine powdery, non-adhering coating.

EXAMPLE 7

Emulsion Stability

Phenoxy emulsions prepared by either succinic anhydride or trimellitic anhydride grafting were observed for stability at ambient temperature. Table II demonstrates that emulsion stability was good.

TABLE II

| STABILITY OF WATER DISPERSION[1] | | |
|---|---|---|
| %[2] | Solvent | Storage[3] |
| Succinic Anhydride | | |
| 5% | 10% Bu Cellosolve | >6 months |
| 10% | 10% Bu Cellosolve | >6 months |
| 20% | 10% Bu Cellosolve | 4 months |
| 20% | None | 4 months |
| Trimellitic Anhydride | | |
| 5% | None | >6 months |
| 10% | None | >6 months |
| 20% | None | 3 months |

[1]Dimethylethanolamine neutralized - 85%
[2]Percent stoichiometry
[3]Storage time at ambient temperature for which emulsion remains stable

EXAMPLE 8

Physical Properties of Acid-Grafted Phenoxy Resins

Succinic anhydride-grafted Phenoxy PKHH was prepared using sufficient succinic anhydride to react with varying percentages of the available hydroxyl groups in the molecule (percent stoichiometry). The reactions were carried out in tetrahydrofuran and the resulting resins were precipitated in isopropanol to produce a powder which was recovered for molding. 25 mil sheets were compression molded at 150° C. and tested for physical properties, shown in Table III. Particular attention should be given to the elongation at break, and pendulum impact, which are a measures of toughness. It is observed that the phenoxy can be grafted up to about 20-40% of its hydroxyl stoichiometry without degrading its physical properties below the level of commercial acceptability.

The physical properties of trimellitic anhydride, phthalic anhydride and tetrahydrophthalic anhydride grafts are shown in Table IV. In this case, the number of carboxylic acid groups generated by grafting is two times the number of hydroxyls involved in the reaction. The aromatic nature of the trimellitic anhydride stiffens the backbone of the phenoxy more than the pendant aliphatic anhydride. Table IV shows that the toughness properties are retained between 5 and 10% stoichiometry.

Phthalic anhydride and tetrahydrophthalic anhydride were grafted at 20% stoichiometry only.

TABLE III

| PHYSICAL PROPERTIES (AVERAGE) OF ACID-GRAFTED PHENOXY RESINS SUCCINIC ANHYDRIDE | | | | | |
|---|---|---|---|---|---|
| Stoichiometry % | Tensile Strength (1000 psi) | Tensile Modulus (1000 psi) | Yield Elong. % | Elong. at Break % | Pend. Impact ft-lbs/in[3] |
| Control 0 | 7.7 | 251 | 4.8 | 82 | 146 |
| 5 | 8.7 | 260 | 6.2 | 111 | 108 |
| 10 | 7.5 | 250 | 4.7 | 44 | 140 |
| 20 | 8.9 | 271 | 5.7 | 36 | 93 |
| 40 | 9.4 | 287 | 5.2 | 43 | 89 |
| 90 | 8.4 | 295 | 4.5 | 32 | 18 |

TABLE IV
PHYSICAL PROPERTIES (AVERAGE) OF ACID-GRAFTED PHENOXY RESINS

| Stoichiometry % | Tensile Strength (1000 psi) | Tensile Modulus (1000 psi) | Yield Elong. % | Elong. at Break % | Pend. Impact ft-lbs/in³ |
|---|---|---|---|---|---|
| *Trimellitic Anhydride* | | | | | |
| 0 | 7.7 | 251 | 4.8 | 82 | 146 |
| 2½ | 6.3 | 207 | 5.2 | 90 | 141 |
| 5 | 6.5 | 214 | 5.3 | 75 | 108 |
| 10 | 6.9 | 224 | 5.0 | 58 | 84 |
| 20 | 7.7 | 222 | 6.0 | 13 | 17 |
| 40 | 8.6 | 261 | 5.5 | 10 | 11 |
| *Phthalic Anhydride* | | | | | |
| 20 | 6.2 | 208 | 5.3 | 28 | 26 |
| *Tetrahydrophthalic Anhydride* | | | | | |
| 20 | 6.4 | 210 | 5.3 | 34 | 94 |

EXAMPLE 9

Coatings Properties

Succinic anhydride and trimellitic anhydride-grafted phenoxy resins were applied as coatings to cold-rolled steel using the following procedure: Cold-rolled steel panels (Q-steel) were cleaned with methyl ethyl ketone and dried in an oven at 60° C. A coating was applied using a wet film applicator having a 3-mil gap. The coating was dried for 1 hour at 25° C. A second coat was applied on top of the first, and was dried similarly. The panels were then baked for 20 minutes at 100° C. The resulting panels had a dry film thickness of 0.9 mil and were exposed to high humidity conditions and salt spray to test their resistance to corrosion. Testing was performed using ASTM D-2247 in a Cleveland Humidity apparatus Model No. QCT-MDO, manufactured by Q-Panel Co. of Cleveland, Ohio. Exposure conditions were 500 hours at 120° F. (49° C.). Results are reported in Table V.

TABLE V
GRAFT-PHENOXY COATINGS ON COLD-ROLLED STEEL

Exposure Conditions:
Cleveland Humidity - 120° F./500 hours

| | Corrosion | Cross Hatch Adhesion |
|---|---|---|
| Succinic Acid (20%) Grafted Phenoxy PKHH | 8 | 100% |
| Phenoxy PKHH | 4 | 0 |
| Salt Spray - 750 hours | | |
| Succinic Acid-Grafted Phenoxy PKHH | 7 | |
| Phenoxy PKHH | 7 | |

Table V shows that the succinic anhydride-grafted phenoxy retains good cross-hatch adhesion after 500 hours of Cleveland Humidity at 120° F. Ungrafted Phenoxy PKHH shows complete loss of adhesion under the same conditions. There is also an advantage in corrosion resistance shown by the grafted phenoxy (a corrosion rating of 10 indicates no change, whereas a rating of 0 is complete failure). Salt spray resistance was evaluated using ASTM B-117. Cross-hatch adhesion was tested using ASTM D-3359-83 (Method B), with the variation that rating was based on the percent of squares not removed, i.e., all removed—0% adhesion, non removed—100% adhesion.

Curiously, salt spray test results did not show an improvement for the grafted resin over the ungrafted.

EXAMPLE 10

Coatings Properties

Trimellitic anhydride-grafted phenoxy resins were applied and tested in a similar manner. Table VI shows the results of Cleveland Humidity Tests. Significant adhesion degradation is seen for resins acid-grafted with less than 5% of the hydroxyl stoichiometry. It was noted that the resins in the 20-40% graft range retained good adhesion in spite of the fact that they were white from water blush.

TABLE VI
TRIMELLITIC ANHYDRIDE-GRAFTED PHENOXY COATINGS ON COLD-ROLLED STEEL

Exposure: Cleveland Humidity - 120° F./250 Hours

| Stoichiometry (%) | Corrosion | Cross-Hatch Adhesion |
|---|---|---|
| 0 - Phenoxy PKHH | 3 | 0% |
| 2½ | 5 | 0% |
| 5 | 7 | 100% |
| 10 | 7 | 100% |
| 20 | — | 100% (Blush) |
| 40 | — | 100% (Heavy Blush) |

Similarly to the results for salt spray of the succinic anhydride-grafted phenoxy resins, the trimellitic anhydride-grafted resins show no significant improvement in salt spray performance.

From the practical standpoint, however, most coatings do not see salt spray conditions, but rather, high humidity which results in loss of adhesion and failure of the paint. Retention of adhesion under field conditions, which are better reflected by the non-salt test, should provide improved coating longevity.

It may also be desirable in some cases that the acid-grafted phenoxy resins be used in coatings with a small amount of epoxy resin so that any carboxyl groups which cannot orient themselves to the steel, due to the rigidity of the polymer backbone, will be tied up and therefore not contribute to water sensitivity. Statistically, not all the carboxyl groups can interact with the surface.

A very useful and surprising advantage of the grafted phenoxy resins of this invention is their beneficial reduction of the viscosity of iron-oxide-containing formulations. This effect should permit the formulation of higher solids iron oxide coatings, which should be useful in, e.g., the manufacture of magnetic media. This effect is illustrated in the following example:

EXAMPLE 11

Effect of Carboxylic Acid Grafted-Phenoxy on Rheology

Table VII shows the effect of trimellitic anhydride acid grafting on the rheology of iron oxide systems. The dispersions were made using a Cowles Dissolver, model no. 1 V G, manufactured by Cowles Dissolver Co., of Cayoga, N.Y. The Dissolver was operated at 4,000 rpm. Substitution of the acid-grafted phenoxy for conventional resin lowered the 20 rpm viscosity to 50% and the 2 rpm viscosity to 30% of the control. The viscosity ratio was also reduced. This therefore offers the advantage of being able to apply higher solids coatings at given viscosities.

TABLE VII

EFFECT OF ACID-GRAFTED PHENOXY ON VISCOSITY OF IRON OXIDE-CONTAINING SYSTEMS

|  | PARTS | |
| --- | --- | --- |
| Phenoxy PKHH in dimethyl Carbitol (20% solids) | 100 | — |
| 20% trimellitic anhydride-Graft Phenoxy PKHH (20% solids) | — | 100 |
| Pferrox 2228 Magnetic Iron Oxide | 42 | 42 |
| Brookfield Viscosity (cps) (Model RVF, Spindle 4, 25.5° C.) | | |
| 2 rpm | 29,000 | 10,000 |
| 20 rpm | 7,600 | 3,800 |
| 2/20 ratio | 3.8 | 2.6 |

When the compositions shown in Table VII were reproduced, but replacing dimethyl carbitol with a like amount of cyclohexanone, the viscosity results were as follows:

| | | |
| --- | --- | --- |
| 2 rpm | 44,000 | 22,000 |
| 20 rpm | 13,400 | 9,800 |
| 2/20 ratio | 3.3 | 2.2 |

I claim:

1. A magnetic coating composition for magnetic recording media comprising:
   (a) a phenoxy resin having pendant secondary hydroxyl groups of which about 3 to about 50% of such hydroxyl groups have been reacted to produce moieties having pendant carboxyl groups,
   (b) a magnetic powder, and
   (c) an organic solvent.

2. A composition of claim 1 wherein the magnetic powder is present in the concentration range of about 1:1 to about 30:1 magnetic power:phenoxy resin.

3. A composition of claim 2 wherein the magnetic powder is present in the concentration range of about 1.5:1 to about 10:1 magnetic powder:phenoxy resin.

4. A composition of claim 1 wherein about 5 to about 25% of said hydroxyl groups have been so reacted.

5. A composition of claim 1 wherein the magnetic powder is iron oxide.

6. A composition of claim 1 wherein the hydroxyl groups have been reacted with a monoanhydride to produce the carboxyl groups.

7. A composition of claim 6 wherein the monoanhydride is succinic anhydride.

8. A composition of claim 6 wherein the monoanhydride is trimellitic anhydride.

9. A composition of claim 1 wherein the phenoxy resin is Phenoxy PKHH.

10. A composition of claim 1 wherein the organic solvent is dimethyl Carbitol.

11. A composition of claim 1 wherein the organic solvent is cyclohexanone.

* * * * *